United States Patent [19]

Fischer

[11] Patent Number: 4,509,763
[45] Date of Patent: Apr. 9, 1985

[54] RADIALLY EXTENSIBLE JOINT PACKING WITH HELICAL SPRING SUPPORT MEANS

[75] Inventor: Richard J. Fischer, Aurora, Colo.

[73] Assignee: The Gates Rubber Company, Denver, Colo.

[21] Appl. No.: 490,649

[22] Filed: May 2, 1983

[51] Int. Cl.³ .............................................. F16J 15/12
[52] U.S. Cl. ................................ 277/163; 277/116.2; 277/177; 277/164; 267/1.5; 267/168
[58] Field of Search ............................. 277/157–165, 277/103, 116.2, 116.4, 116.6, 116.8, 177; 267/1.5, 168, 169, 179

[56] References Cited

U.S. PATENT DOCUMENTS

| | | | |
|---|---|---|---|
| 2,001,835 | 5/1935 | Cook | 267/168 X |
| 2,243,227 | 5/1941 | Stratton | 277/157 X |
| 2,610,846 | 9/1952 | Hanna | 267/1.5 |
| 2,721,091 | 10/1955 | Pfefferle et al. | 267/168 X |
| 2,957,717 | 10/1960 | Bram | 277/163 |
| 3,011,775 | 12/1981 | MacLeod | 267/168 X |
| 3,186,701 | 6/1965 | Skinner | 277/163 X |
| 3,215,208 | 11/1965 | Tamplen | 277/116.8 |
| 4,008,898 | 2/1977 | Weldon | 277/116.2 |
| 4,190,258 | 2/1980 | Arai et al. | 277/165 X |
| 4,379,558 | 4/1983 | Pippert | 277/164 X |

Primary Examiner—Robert S. Ward
Attorney, Agent, or Firm—H. W. Oberg, Jr.; C. H. Castleman, Jr.

[57] ABSTRACT

A polymeric type joint packing having a garter spring circumferentially oriented near one packing end where the garter spring has a helical core diameter that is greater than a radial gap to be sealed by the packing.

12 Claims, 12 Drawing Figures

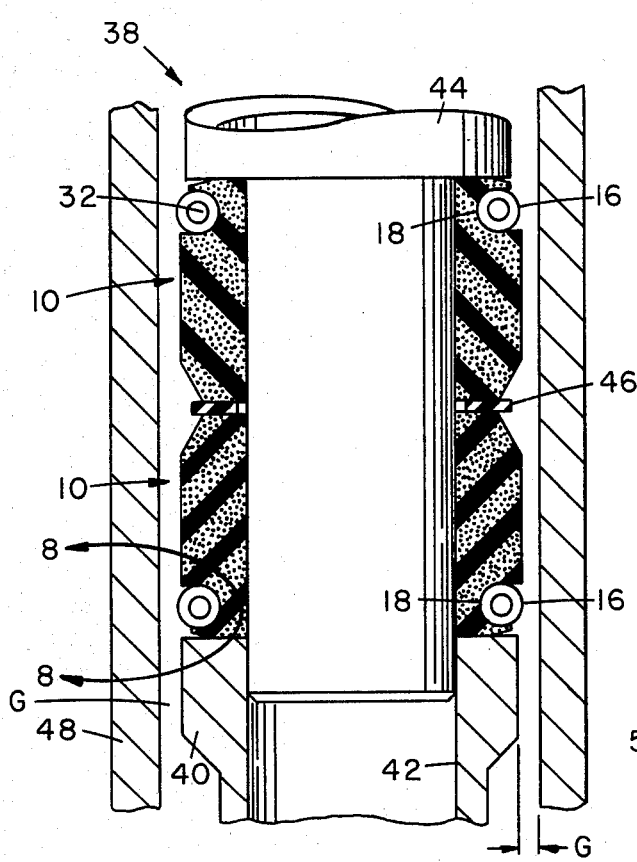
FIG. 7
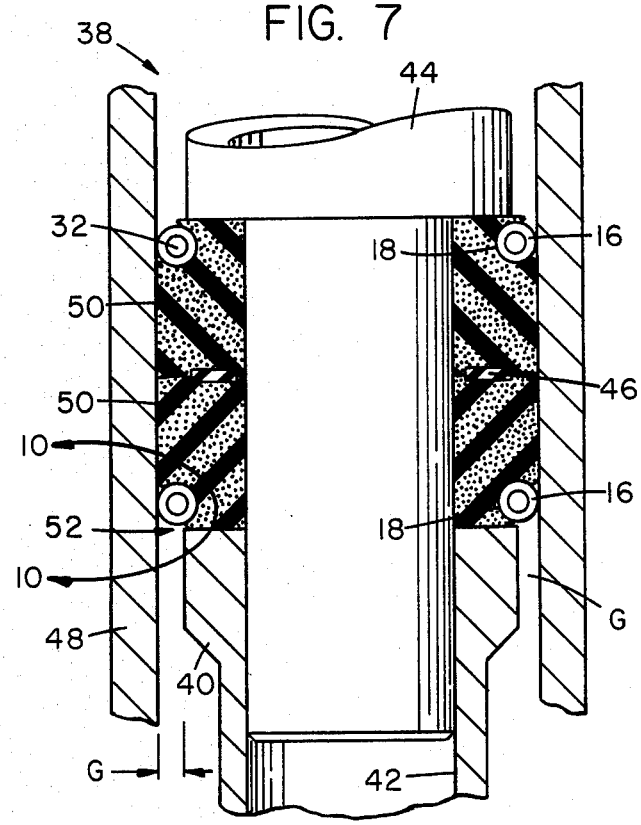
FIG. 9
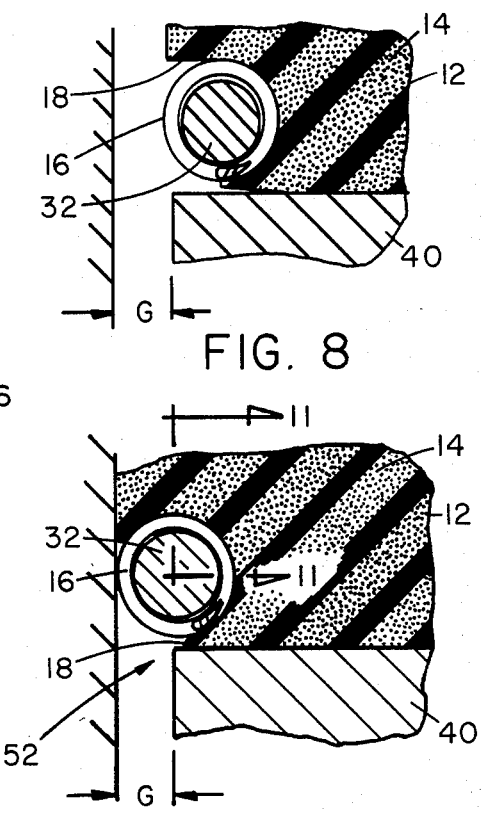
FIG. 8
FIG. 10
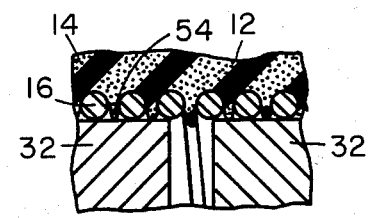
FIG. 11
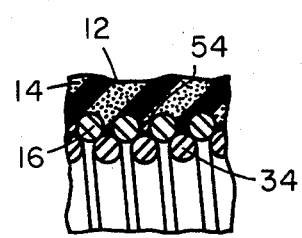
FIG. 12

RADIALLY EXTENSIBLE JOINT PACKING WITH HELICAL SPRING SUPPORT MEANS

BACKGROUND OF THE INVENTION

The invention relates to joint packings, but more particularly, the invention relates to a packing with an elastomeric core that is radially extensible when externally clamped. Annularly shaped elastomeric core type packers are used extensively by the petroleum industry in a variety of tools that selectively seal various portions of an oil well type casing. While separate tools may be required to perform various oil well operations, several of the tools use the same or similar type of sealing means in the form of an annularly shaped polymeric core. The core is radially extensible when externally clamped along the longitudinal axis of the core. When clamped, circumferential portions of the core contact and press against an internal wall of a well casing to effect a seal. Differential pressure is customarily applied across the effected seal where pressure at the "up-hole" side of the joint packing in the well casing is higher than the pressures at the "down-hole" side of the packing. Of course, the direction of the pressure differential may be reversed in some applications. The differential pressure causes the packing to deform and distend into an annular radial gap being sealed. Present day packers have a high compression modulus (e.g., from about 525 psi to about 725 psi at 25 percent compression at 300° F. on a first compression cycle) to resist such deformation while maintaining an effective seal. Some joint packings are made with two elastomeric stocks of different moduli where a softer elastomeric stock is located along a center portion of the joint packing to enhance radial extensibility. Combinations of time, temperature, differential pressure, and compressive force affect the useful life of such packings as measured by their ability to maintain an effective seal when radially extended to seal an annular radial gap. Of these, temperature and differential pressure are, perhaps, most detrimental and cause failure by overly distending an annular radial portion of an elastomeric core type packing. For example, a core type packing having approximately a 4.5 inch diameter, 3 inch length, and approximately a 1 inch radial thickness, may maintain an effective seal at differential pressures from about 3500 psi to about 4500 psi at 300° F. The same type packing will only handle a differential pressure from about 1000 psi to about 2000 psi at a temperature of 500° F. while maintaining an effective seal. Such packings will not seal a differential pressure from about 5000 psi to about 5500 psi at temperatures as low as 200° F. A typical failure of such packings is a rupturing of the polymer at the distended annular radial portion on the low pressure side with an associated loss of radial extension (and hence, effective sealing).

Some petroleum well environments require sealing a casing at temperatures above 300° F. and differential pressures greater than 4500 psi.

SUMMARY OF THE INVENTION

In accordance with the invention, an annularly shaped polymeric core type joint packing is provided that is radially extensible when externally clamped along a longitudinal axis to seal an annular radial gap. The packing is capable of maintaining an effective seal at temperatures above 300° F. and pressures above 4500 psi and up to 10000 psi. Improved performance is achieved by supporting a portion of the elastomeric core where it would otherwise distend along an annular radial gap. The core is supported at least one of its ends by means of a garter type spring that has a helical coil diameter generally greater than the radial gap to be sealed. Improvements in sealing pressures are achieved by reinforcing the polymeric core with embedded fibrous reinforcement such as fiber glass. The spring may be at least partially retained in a circumferential groove formed in the core, or the spring may be integrally molded in a portion of the core.

Other features of the invention will be apparent after reviewing the figures and description thereof wherein:

FIG. 7 is a partial axial cross-section showing the use of two FIG. 1 type joint packings of the invention as part of a tool positioned in a casing;

FIG. 8 is an enlarged partial view taken along the line 8—8 of FIG. 7;

FIG. 9 is a view similar to FIG. 7 but showing the tool externally clamping joint packings to cause them to radially extend and seal an annular radial gap as differential pressure is applied across the packings;

FIG. 10 is an enlarged partial view taken along the line 10—10 of FIG. 9; and

FIG. 11 is a partial view taken along the line 11—11 of FIG. 10.

FIG. 12 is a partial view similar to FIG. 11 and showing the embodiment of FIG. 3.

DESCRIPTION OF PREFERRED EMBODIMENTS

Referring to the figures, a joint packing 10 of the invention is shown which has a generally piston-like polymeric core 12 with a longitudinal axis. The core may be made from any of the suitable polymers having elastomeric characteristics such as natural rubber, synthetic rubber, or blends thereof, or castable synthetic rubbers such as polyurethane. The type of polymer is chosen for its intended use such as for being chemically resistant to chemicals such as oil, acid, alkalines, etc. The core is made of a polymer having elastomeric characteristics so that it is radially extensible relative to its longitudinal axis. Any desired means such as a mechanical means, hydraulic means, or pneumatic means may be used to externally clamp the body along its longitudinal axis and radially extend the body to seal an annular radial gap. Optionally, the body is reinforced with a fibrous reinforcement 14 such as discontinuous fiber in the form of chopped fiber glass. The reinforcement is optionally included to improve the effective sealing pressure of the joint packing when in use.

Figure 1:
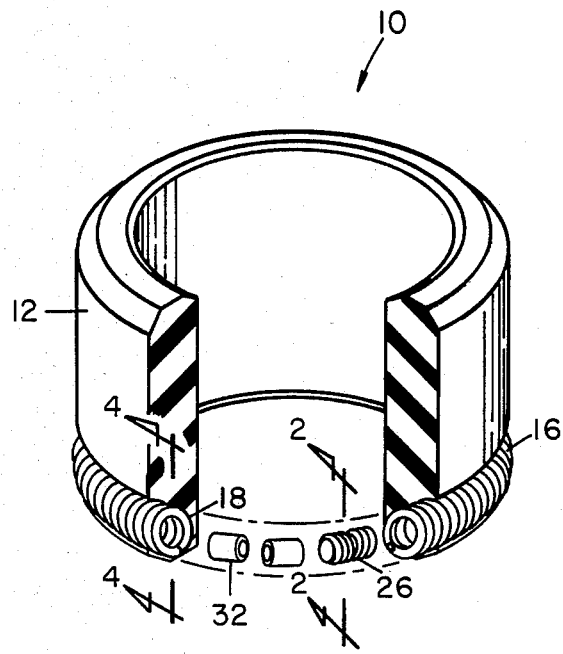
FIG. 1 is an isometric view of a joint packing of the invention with a portion cutaway to show various aspects of the invention.
Figure 2:
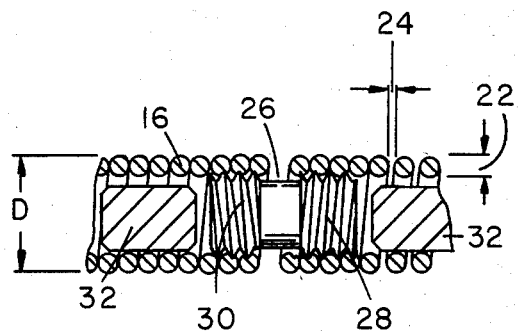
FIG. 2 is an enlarged partial view taken along the line 2—2 of FIG. 1.
Figure 5:
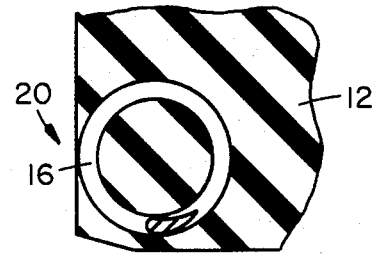
FIG. 5 is a view similar to FIG. 4 but shows an alternate embodiment.
Figure 6:
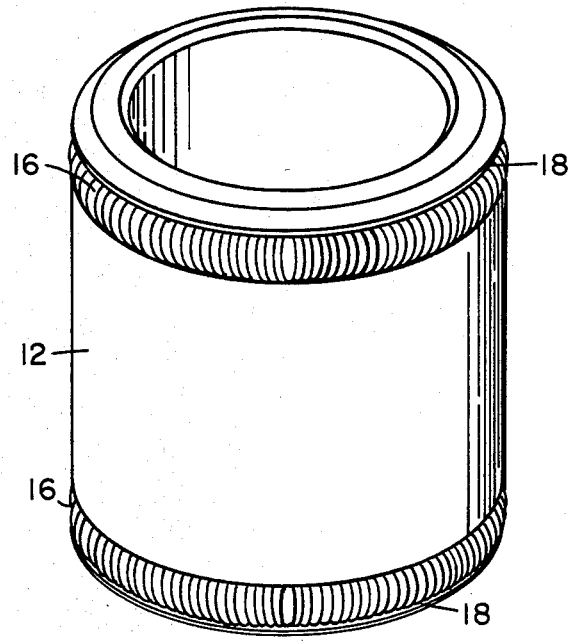
FIG. 6 is an isometric view showing an alternate packer of the invention.

A circumferentially oriented garter type spring 16 is located in a portion of the core juxtaposed at least one end of the core as shown in FIG. 1. Optionally, springs may be used juxtaposed both ends of a core as shown in FIG. 6. A spring may be located and at least partially retained in a portion of the core by forming a circumferential groove 18 in the core as shown in FIGS. 1, 4, 6-10, or the spring may be integrally molded 20 in a portion of the core as shown in FIG. 5.

The spring has a helical coil diameter D that is greater than the radial gap G to be sealed. The spring is formed of a wire of a chosen diameter 22 and it is formed of a material or is protected by a material that is suitable for use in the packer environment such as exposure to hydrogen sulfide. The spring supports the packer across the radial gap to inhibit distention of the packer when differential pressures are applied across the packer. The amount of support the spring gives the packer is affected by the spacing 24 between successive helical coils and by the diameter 22 of the wire forming the coils. The smaller the spacing the greater the support. Similarly, the greater the wire diameter, the greater the support. Preferably, the spacing between successive coils is less than two times the wire diameter for good support.

The spring may be formed by hooking together free ends of a spring in known manner, the spring may be of the continuous type as shown in FIG. 6, or the ends may be joined together by means of a coupling member 26 that threads into the inside of the spring. Optionally, such a coupling member may have left-hand 28 and right-hand 30 threads to facilitate easy joining of the spring ends.

Figure 3:
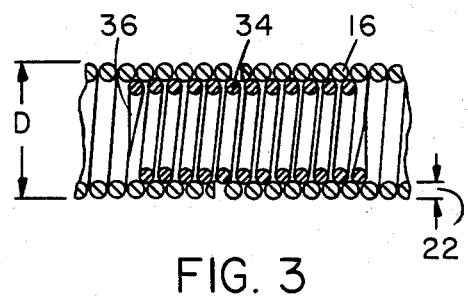
FIG. 3 is a view similar to 2 showing an alternate embodiment of the invention.
Figure 4:
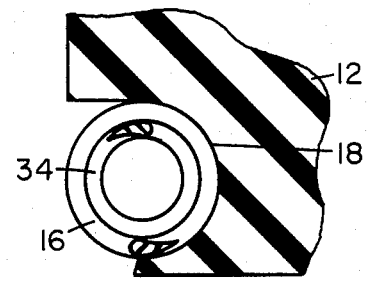
FIG. 4 is a view taken along the line 4—4 of FIG. 1 showing the embodiment of FIG. 3.

At differential sealing pressures above 6000 psi, some springs may diametrically collapse or the helical coils partially collapse by laying over on their sides and polymeric material forming the core may extrude through the spacings between successive helical coils. Optionally, a means is provided for inhibiting diametric collapse of the helical coils of the garter spring at high pressures. As shown in FIGS. 1, 2, and 7 through 11, the collapse inhibiting means may be a plurality of generally cylindrical pins 32 that are disposed within the helical coils of the spring in end-to-end fashion as particularly illustrated in FIGS. 1 and 11. The pins 32 block some of the spacing between successive coils of the garter type spring 16 to inhibit rubber extrusion therethrough at high differential pressures as illustrated in FIG. 11. The collapse resistant means may be in the form of a second helically coiled spring 34 that screws within the inside diameter of the garter type spring 11. The coils of the second spring 34 block the spacing between successive coils of the garter type spring 16 as illustrated in FIG. 12. Also, the second spring may be used as a means for coupling the ends of the garter type spring together by threading 36 it into the spring 16 as illustrated in FIG. 3. The pins have the advantage of being more rigid than the second helical spring but the pins are not as effective as the second spring in blocking all the spacings between successive coils of the garter spring.

In use, one of the FIG. 6 type packings or two of the FIG. 1 type packings are assembled as part of a clamping tool 38. Two packings are illustrated in FIG. 7. A "down-hole" portion of the tool may have an annular flange 40 that abuts an end portion of one packing and an internal bore 42 which receives a collared piston 44 that engages an end portion of a second packing. A washer 46 may be disposed between the two packings. The tool is placed in a casing 48 where there is an annular radial gap G to be sealed. The helical coil diameter of the packing spring is greater than the radial gap to be sealed.

When the tool is activated as shown in FIG. 9, there is relative axial movement between the tool components causing corresponding axial clamping of the packings which make them radially extend and engage 50 the well casing. The movement of the radially extensible core circumferentially extends the spring and places it in engagement 52 between the casing and a portion of the tool. Differential pressure is then be applied across the packings and acts to distend an annular ring portion of the packing where it is supported by the spring. As shown in FIGS. 11 and 12 portions 54 of the elastomeric material are extruded between the spring coils to be further supported by the cylindrical pins 32 or the second spring 34. When the differential pressure and clamping force are released, the spring retracts towards its initial position. Packings having springs of the embedded type as shown in FIG. 5 are less likely to fully retract after initial clamping.

To illustrate the improvement which the spring joint packing embodiment of the invention provides over similar prior art packings without a spring, the core of the configuration shown in FIG. 1 is constructed with a 4.45 inch outside diameter, a 2.75 inch inside diameter, a 2.86 inch axial length, and a 3.45 inch diameter spring receiving groove juxtaposed one end. A spring is retained by the groove and has a 0.5 inch helical coil diameter, a 0.12 inch wire diameter and is formed so that there was less than 1 coil diameter (0.030 inches) between successive helical coils before the packing is externally clamped. A first group of core bodies is reinforced with about 11 percent by volume of fiber glass to yield a compression modulus of about 1700 psi at about 25 percent compression while at 300°. Two of such packings are used with the clamping tool in the manner shown at FIGS. 7 and 9 to seal a cylindrical bore having a 4.95 inch diameter and a radial clearance of 0.25 inch between the core casing (and an annular radial gap G of 0.20 between the tool and casing). The example packing repeatedly effected a satisfactory seal at pressures up to about 10000 psi at temperatures of 300° F.

A second group of joint packings are constructed in the manner above described except that fibrous reinforcement is eliminated from the packings and no collapse resistant means is used in conjunction with the spring. The so constructed elastomeric bodies exhibit a compression modulus of about 1480 psi at 25 percent compression at 300° F. Packings of the second group effected satisfactory seals repeatedly at pressures up to about 6000 psi at temperatures of 300° F. The packings of the invention were suitable for reuse after 4 to 5 cycles wherein packings of the prior art exhibit failure at radially distended annular portions of the packing on a first cycle.

The foregoing detailed description is made for purpose of illustration only and is not intended to limit the scope of the invention which is to be determined from the following claims.

What is claimed is:

1. In a joint packing of the type used to seal an annular radial gap and having a generally annularly shaped polymeric core, with two ends, that is radially extensible when externally clamped along a longitudinal axis of the core to seal the annular gap, the improvement comprising:

a core having at least one circumferential groove located next to at least one end; and a garter type spring circumferentially oriented to and located in the groove of the core and having a helical coil diameter generally greater than the radial gap to be sealed and wherein the groove has a depth that is substantially equal to the helical coil diameter.

2. The joint packing as claimed in claim 1 which further includes a means for inhibiting diametric collapse of helical coils of the garter spring.

3. The joint packing as claimed in claim 2 wherein the collapse inhibiting means includes a plurality of generally cylindrical pins disposed within helical coils of the garter spring.

4. The joint packing as claimed in claim 2 wherein the collapse inhibiting means includes a second helical coil spring disposed within the helical coils of the garter spring.

5. The joint packing as claimed in claim 1 wherein fibrous reinforcement is embedded in the core.

6. The joint packing as claimed in claim 5 wherein the fibrous reinforcement is discontinuous fiber.

7. The joint packing as claimed in claim 1 wherein a closest spacing between successive coils of the garter spring is less than two times the diameter of a wire that comprises the spring.

8. The joint packing as claimed in claim 7 wherein the spring wire diameter is from about 0.05 inches to about 0.12 inches.

9. The joint packing as claimed in claim 1 wherein the garter spring has an external surface that is resistant to deterioration when exposed to hydrogen sulfide.

10. In a joint packing of the type used to seal an annular radial gap and having a generally annularly shaped polymeric core, with two ends, that is radially extensible when externally clamped along a longitudinal axis of the core to seal the annular gap, the improvement comprising:
a core having at least one circumferential groove juxtaposed at least at one end;
a fibrous reinforcement embedded in the core;
a spring at least partially retained in the groove and having successive helical coils, a wire diameter, an inside, and a helical coil diameter generally greater than the radial gap to be sealed and wherein a minimum spacing between successive coils is less than about two times the wire diameter.

11. The joint packing as claimed in claim 10 which further includes a means for supporting helical coils of the spring from the inside of the spring.

12. In a joint packing of the type used to seal an annular radial gap and having a generally annularly shaped polymeric core, with two ends, that is radially extensible when externally clamped along a longitudinal axis of the core to seal the annular gap, the improvement comprising:
a garter type spring circumferentially oriented to and located in a portion of the core juxtaposed at least one end and having a helical coil diameter generally greater than the radial gap to be sealed; and
a means for inhibiting diametric collapse of helical coils of the garter spring which includes a plurality of generally cylindrical pins disposed within helical coils of the garter spring.

* * * * *